Nov. 21, 1933.  W. COMISKY  1,936,226
SHUTTLE
Filed April 2, 1932
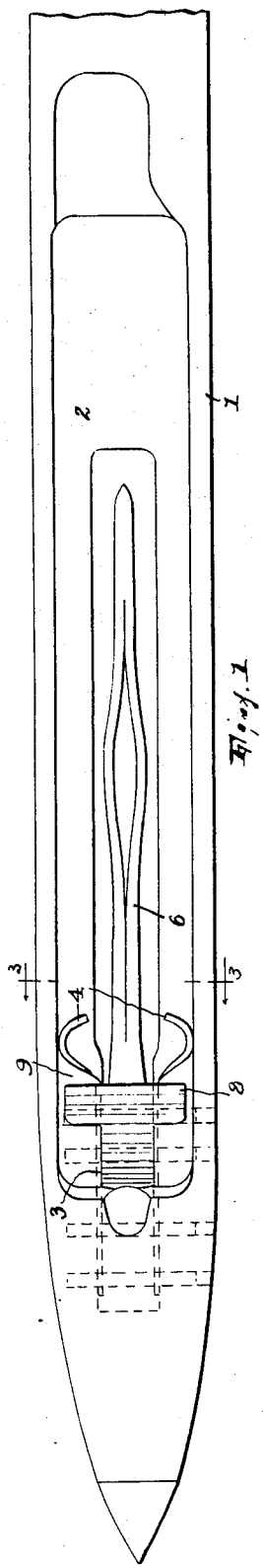
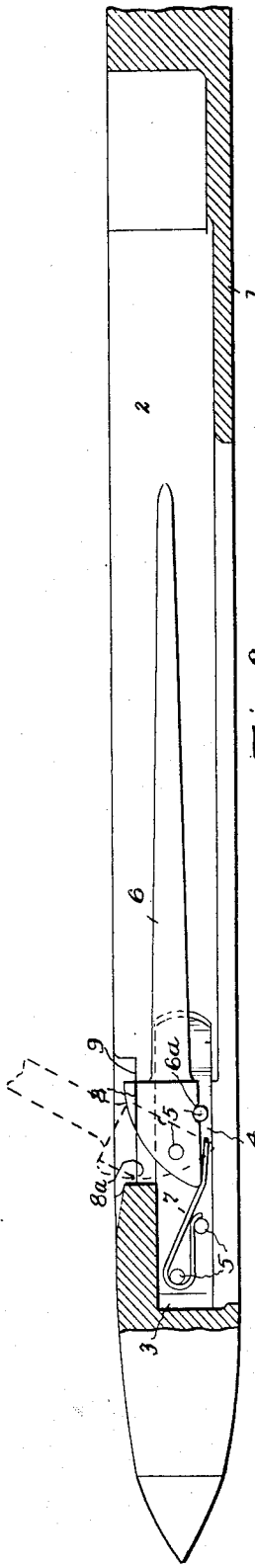
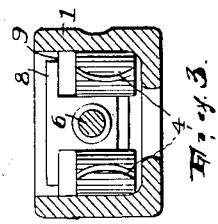
INVENTOR,
William Comisky
BY
ATTORNEY Patented Nov. 21, 1933

UNITED STATES PATENT OFFICE 1,936,226

SHUTTLE

William Comisky, Prospect Park, N. J., assignor to United Reed and Harness Company, Paterson, N. J., a firm composed of Richard Sedlatschek and Frank Sedlatschek Application April 2, 1932. Serial No. 602,722

2 Claims. (Cl. 139—208)

In shuttles of the type in which the spindle is pivoted on a transverse axis so that it may be elevated to remove the empty quill, cop or other core of the weft package and replace it with a fresh package the movement of the spindle to depress it is usually limited by a stop-pin which the spindle butt engages between walls of the shuttle body bridged by said stop-pin. A known and serious fault of this construction is that either this stop-pin or a similar pin on which the shuttle is pivoted, or both, in time becomes bent—in part by the spindle being manually pressed down while in contact with the stop-pin and in part by the weaver allowing the spindle to fall under the action of the spindle spring—which involves depression of the point of the spindle so that the filling or weft cannot run off the package with the same freedom it experiences when the spindle is truly horizontal, wherefore the filling breaks. To overcome this fault the weaver usually bends the spindle to raise its point to the desired level, but this when done repeatedly causes the spindle to become so flexed that it strains and frequently splits or disrupts the quill or cop when the same is applied thereto, and in any event it only aggravates the breakage of the filling because of the distortion (flexing) which is imparted to the package by the bent spindle.

My object is to construct a shuttle of the type indicated so as greatly to delay abnormal depression of the spindle and if and when it does occur to make it possible for the weaver readily to correct it without bending the spindle.

In the drawing,

Fig. 1 is a plan;

Fig. 2 a longitudinal section; and

Fig. 3 a cross-section on line 3—3, Fig. 1, of the improved shuttle.

The shuttle body 1 has the usual cavity 2 for the weft package and a mortise 3 forming an end reduced extension of the cavity. In the mortise may be the usual clips 4 to engage and hold the quill when the weft package core takes that form, these being held in place by four pins 5. On one of these pins the butt of the spindle 6 is pivoted and on two others the spring 7 which controls the spindle, to hold it either elevated or depressed, is mounted, all in the usual manner. The spindle butt may be cut away as at 6a, so as to clear the remaining or fourth pin.

The spindle butt, whose butt proper is shown closely fitting between the clips 4, is formed with two wings or lugs 8 projecting laterally from such butt proper and which overhang the shuttle body both sides of the mortise and whose under sides are so formed as broad faces and positioned that when the spindle is depressed to its full normal limit they bear against and lie in face to face contact with the surfaces 9 of said body both sides of the mortise, said lugs being also positioned so that when the spindle is raised they abut the shuttle body, as at 8a, and limit the raising movement. The mortise 3 is partially covered by a bridging portion 1a of the shuttle body and at the end of such portion adjoining cavity 2 said portion affords an abutment 1b. When the spindle is raised the butt, specifically its abutment, receiving the contact of the lugs, forms a stop to limit the raising movement. In order to prevent the catching of the weft or filling on the top surface of the butt the portions of said surface from front to rear thereof and also in any plane through the butt proper and lugs are substantial continuations of each other.

By this construction a more solid or rigid support for the spindle, when depressed, is afforded than is afforded by the bridging stop-pin, so that the tendency of over-depression is very greatly discouraged.

Further, if in time the spindle should become overdepressed, as by its pivoting pin becoming somewhat bent, my construction readily permits the weaver to introduce a shim of paper or the like to raise it to the necessary level. This is done by inserting the shim under one of the lugs 8 so that it is clamped between it and the shuttle body. This expedient is possible by my invention because the contact here takes place with respect to a surface of the fixed structure of the shuttle that is at the exterior.

Having thus fully described my invention what I claim is:

1. The combination with a shuttle body having a weft package receiving cavity, of a spindle having a butt pivoted in the body at one end of the cavity and having integral lugs oppositely outstanding from its opposite sides and bearing on the opposite side walls of the body when the spindle is depressed in the cavity, said lugs being relatively immovable with respect to the butt and having their top surfaces in line and blending with the top surface of the butt, and constituting a smooth unbroken continuation of the top face of said butt.

2. The combination with a shuttle body having a weft package receiving cavity, of a spindle having a butt pivoted in the body at one end of the cavity and having integral lugs oppositely outstanding from its opposite sides and bearing on the opposite side walls of the body when the spindle is depressed in the cavity, said butt having its top face curving rearwardly and inwardly toward the free end of the same, and the lugs having their top faces correspondingly curved and being in line with the top face of the butt, thereby providing a smooth unbroken top surface throughout the area of the butt and lugs.

WILLIAM COMISKY.